Figure 1:
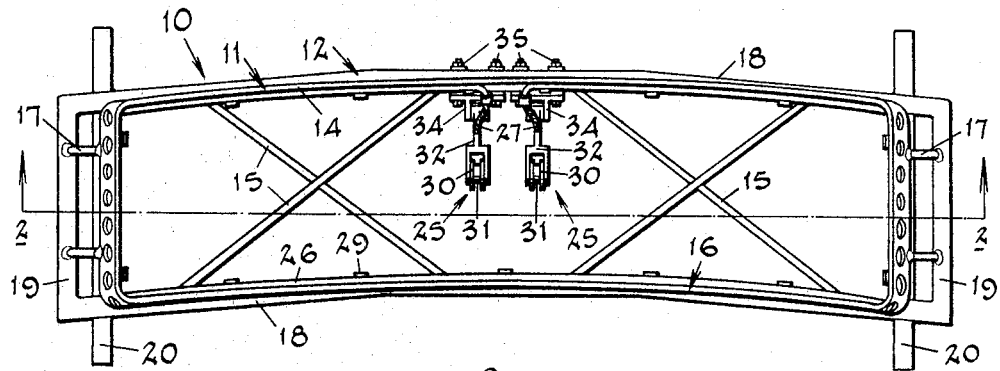

Oct. 11, 1966   H. A. LEFLET, JR   3,278,288
METHOD AND APPARATUS FOR BENDING AND TEMPERING GLASS SHEETS
Filed April 15, 1963

INVENTOR.
Herbert A. Leflet, Jr.
BY
Nobbe & Swope
ATTORNEYS

United States Patent Office 3,278,288
Patented Oct. 11, 1966

3,278,288
METHOD AND APPARATUS FOR BENDING AND TEMPERING GLASS SHEETS
Herbert A. Leflet, Jr., Toledo, Ohio, assignor to Libbey-Owens-Ford Glass Company, Toledo, Ohio, a corporation of Ohio
Filed Apr. 15, 1963, Ser. No. 273,193
3 Claims. (Cl. 65—104)

The present invention relates broadly to the production of curved sheets or plates of glass and more particularly to an improved method and apparatus for bending and annealing said sheets or plates.

In the production of curved glass sheets according to generally known procedures, a flat glass sheet to be bent is supported on a ring or skeleton type bending mold having a shaping surface conforming in outline and curvature to the glass sheet after bending. While thus supported, the sheet is heated to an elevated temperature corresponding to the softening point of the glass permitting the sheet to sag into contact with the shaping surface. After the sheet is bent and while it is resting on the shaping surface of the mold, the sheet is annealed or cooled in a controlled manner to a temperature below the annealing range of the glass.

As a result of the sheet being heated and subsequently cooled in the above-described manner, internal stresses are developed in the glass. The nature of these stresses, that is, whether they are tensile or compressive in character, depends upon the rate of cooling of the glass from the elevated bending temperatures. By cooling different regions of the sheet at different rates, a preselected pattern of localized stresses may be imparted to the sheet. The regions of the sheet which cool relatively fast are permanently stressed in compression while the regions cooled at a comparatively slower rate become stressed in tension. In the glass sheet as a whole, at temperatures below the glass annealing range, a condition of stability or equilibrium exists wherein the tensile and compressive stresses are in balance.

Since glass is structurally more rugged in nature and better able to resist chipping or breaking when stressed in compression, the above-described capacity of glass to physically respond to the rate at which it is cooled from an elevated temperature can be utilized in the production of certain "end products" such as curved vehicle windshields or the like. Since the abuses to which windshields are subjected during handling, storing, shipping and ultimately installation are concentrated primarily on the edges thereof, placing the edges under compressive stress provides a stronger, more damage resistant product. Since, as is generally known, the strength of glass is proportional to the intensity of the internal stress in compression, the break resistant qualities of the windshield are dependent upon the intensity or unit value of the compressive stress imparted to the sheet edges.

It is, therefore, an important object of the present invention to provide a curved glass sheet of the above character having compressive stress of high intensity, as compared to formerly known sheets of this type, in the regions of the marginal edges thereof thereby rendering the sheet stronger and more resistant to chipping and breaking.

Another important object of the invention is to provide a novel and improved method of and apparatus for bending and annealing glass sheets and for producing a preselected stress pattern in the glass sheets.

Another object of the invention is to accomplish the foregoing by initiating a pronounced differentiation in the cooling rate of preselected areas of the sheet.

Still another object of the invention is to control the cooling rate of specific regions of the glass sheet by supplementally heating these areas whereby to maintain them at an elevated temperature until the remainder of the sheet has been cooled.

Other objects and advantages of the invention will become more apparent during the course of the following description when taken in connection with the accompanying drawings.

Figure 2:
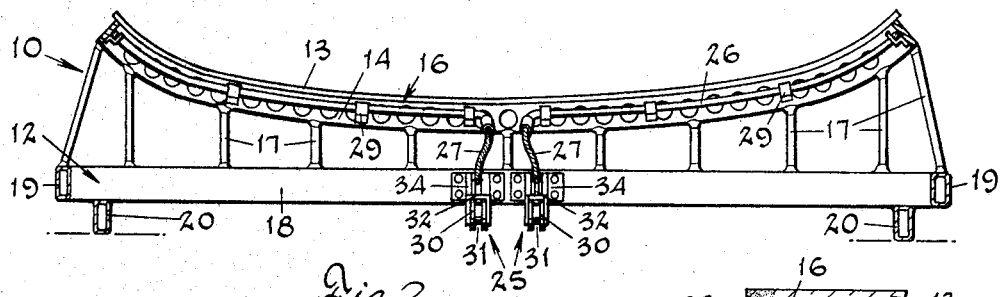
Figure 3:
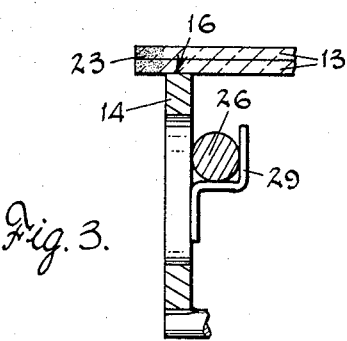
Figure 5:
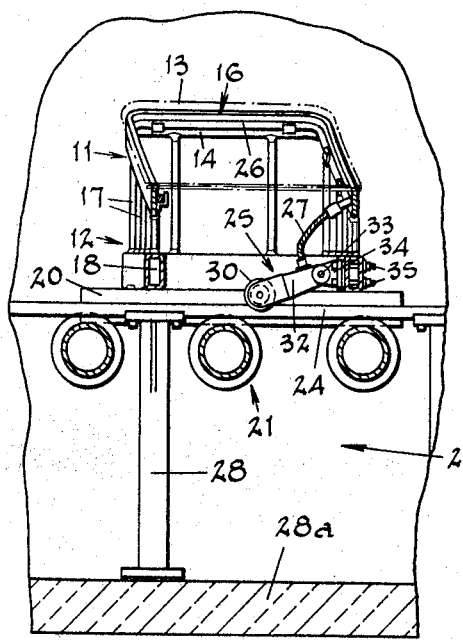
Figure 4:
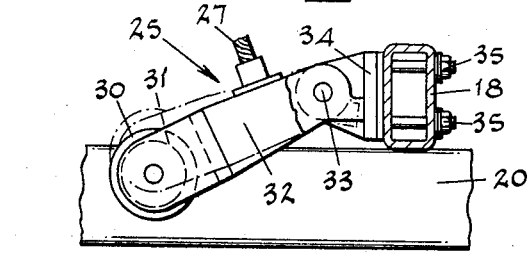

In the drawings, wherein like numerals are employed to designate like parts throughout the same:
FIG. 1 is a plan view of a bending apparatus embodying the novel features of the present invention;
FIG. 2 is a sectional view taken along line 2—2 in FIG. 1;
FIG. 3 is a fragmentary sectional view of a shaping rail showing the heating unit associated therewith;
FIG. 4 is an enlarged view of the conducting roller; and,
FIG. 5 is a fragmentary cross sectional view of a bending furnace showing the improved bending apparatus disposed therein.

For purposes of illustration, the present invention is shown in the drawings as embodied in apparatus for producing curved glass sheets for use in the fabrication of automobile windshields formed of two sheets of glass and a plastic interlayer interposed between the glass sheets and bonded thereto. In general, the apparatus 10 includes an outline or skeleton-type bending mold 11 carried by a rack 12 and adapted to support superimposed pairs of glass sheets 13 to be bent. The mold 11 comprises a relatively narrow, continuous shaping rail 14 arranged in a closed configuration conforming in outline to the glass sheets and braced by rods 15 extending across the mold, with their opposite ends secured to the shaping rail 14. A shaping surface 16 conforming in curvature to the glass sheets when bent is formed on the upper edge of the shaping rail. The shaping rail 14 is supported by posts 17 upstanding from the rack 12 which comprises generally rectangularly arranged side rails 18 and end rails 19 joined together into a rigid structure. Guide rails 20 are secured to the underside of the rack 12 to guide the latter for movement over a roller type conveyor 21 through a tunnel type bending furnace 22 shown, in part, in FIG. 5.

It will be apparent that the particular outline of the shaping rail 14 and the curvature of the shaping surface 16 depend upon the shape and curvature to be imparted to the glass sheets when bent. Moreover, the construction of the mold is, to some extent, dictated by the curvature to which the sheets are to be bent. In this connection, a solid ring mold of the type illustrated is usually employed in bending glass sheets to relatively shallow curvatures while a so-called "hinged" mold comprising a number of articulated mold sections is generally utilized in bending sheets to relatively sharp curvatures. The invention hereinafter described is not intended to be limited in any way to a bending mold of a particular shape, curvature or construction.

As outlined above, the production of curved vehicle windshields is accomplished, according to one generally known commercial practice, by supporting pairs of glass sheets on a bending mold of the general type described and moving the mold and sheets through a bending zone of a tunnel type bending furnace to raise the temperature of the sheets to the softening point of the glass whereupon the sheets sag under the influence of gravity into contact with the curved shaping surface of the mold. While resting on the shaping surface of the mold, the sheets are moved through an annealing zone of the furnace and cooled to a temperature below the annealing range of the glass.

As the mold passes through the bending zone, the shaping rail absorbs heat from the furnace and this residual heat retards cooling in the annealing zone of those portions of the sheet in contact with and closely adjacent to the shaping surface resulting in these portions being stressed in tension. By using a mold in which the shaping rail 14 defines an outline slightly smaller than the outline of the pattern-cut glass sheets 13 to be bent, the shaping surface 16 of the shaping rail contacts the bottom sheet inwardly of the marginal edges thereof whereby a band of tensile stress is developed in the sheets which is balanced by compressive stress in the overhanging edge portions 23 of the sheets.

Since, at normal temperatures, the internal stresses in the glass sheets are in balance, the intensity of the compressive stress in the edge portions of the sheets is dependent upon the magnitude of the tensile stress imparted to the sheets as a result of the thermal capacity of the shaping rail. In this way, the edge strength of the finished product is proportional to the differential in the rate of cooling between the edges of the glass sheets and the areas of the sheets in contact with or adjacent to the shaping rail which, in turn, is dependent on the capacity of the shaping rail to retard cooling of the overlying areas of the glass sheets and thereby maintain these areas at higher temperatures for longer periods of time. The cooling retardation which may be accomplished by the shaping rail is a function of its ability to absorb heat as the mold passes through the bending zone of the furnace and to radiate this heat to the sheets as the mold passes through the annealing zone of the furnace. Thus the efficiency with which a shaping rail performs this function is dependent somewhat upon the particular material from which it is formed and its mass. There are, however, definite limitations on the ability of a shaping rail to absorb heat regardless of the material from which it is formed or its size. In other words, for any material the mass of the shaping rail may not be greater than that mass which may be heated throughout as the mold passes through the furnace.

In order to insure that the desired areas of the glass sheets will be held at an elevated temperature for a longer period of time than the remainder of the sheets and thus to insure that a definite stress pattern will be produced in the sheets, the present invention contemplates applying supplemental heat to these areas as the sheets are moved through the annealing zone of the furnace. More particularly, the invention contemplates the supplying of supplemental heat to the shaping rail 14 to retard cooling of the rail and thereby the overlying areas of the sheets as the mold moves through the annealing zone. In this manner, the ability of the shaping rail to retard the cooling of the overlying areas of the sheets and thereby to maintain these areas at an elevated temperature for a prescribed period of time is not dependent entirely upon the amount of heat the rail absorbs from the furnace. By artificially heating the shaping rail according to this invention, closer control over the differential cooling rate of the glass sheets may be obtained since the somewhat unpredictable factors, such as how much heat the shaping rail will absorb and how fast this absorbed heat will be dissipated, are not controlling.

It is not intended that the invention be limited to the use of any particular source of energy for supplementally heating the shaping rail. Within the spirit of the invention, the supplementary heat could be supplied by a flame or by conduits mounted on the rail through which conduits a suitable heating medium could be circulated. However, in a preferred embodiment, a detailed description of which follows, the supplemental heat is derived from electrical energy.

In another of its aspects the invention contemplates a novel apparatus by which the supplemental heat can be supplied to the shaping rail in a simple, yet efficient, manner. Generally, this is accomplished by electrically heating the shaping rail 14, with the power being supplied by bus bars 24 extending through the desired zones of the furnace and conducted to the shaping rail by coupling means 25 carried by the bending apparatus. To this end, electrical heating elements 26, of the resistance type, are mounted on the shaping rail and are coupled by a flexible conductor 27 to the coupling means 25 mounted on the rack 12 and adapted to move along the bus bars 24 supported in the furnace 22 above the conveyor 21 by pedestals 28 upstanding from the furnace floor 28a.

The heating element 26 is disposed adjacent the inner side of the shaping rail 14 below the shaping surface 16 and is attached to the rail by offset clips 29 secured to the rail. While the heating element need only be utilized adjacent the areas of the sheet where a greater differential in cooling rate is desired to produce a stronger compression edge, in the illustrated embodiment the heating element extends around the entire periphery of the mold thereby to produce more compression stress in the entire peripheral edge portions of the sheets.

Heating of the shaping rail 14 may be started at any desired point as the mold 11 moves through the furnace 22 and may be continued through the annealing zone as the edge and major portions of the sheets are cooled until the desired stress pattern is achieved. Preferably the supplementary heating of the shaping rail would begin when the mold is in, or closely adjacent to, the bending zone of the furnace and while the sheets are at the elevated bending temperature. The supplemental heating would be discontinued at a point within the annealing zone of the furnace whereat the remainder of the sheets has cooled to a temperature below 900° F.

Now, initiating and discontinuing the supplementary heating may be accomplished in any appropriate manner such as by suitable switching arrangements preset or actuated by the passage of the mold through the furnace or by simply extending the bus bars 24 through those portions of the furnace wherein supplemental heating is desired.

As shown in FIG. 1, the heating element 26 starts at the center of the mold 11 and extends continuously around the mold back to the starting point, with its free ends connected by the flexible conductors 27 to the coupling means 25 mounted on the mold rack. Thus the current flows from one bus bar 24 through the coupling means 25, the flexible conductor 27 around the heating element 26 and back to the other bus bar through the second coupling means 25 and conductor 27.

Each of the coupling means 25 comprises a wheel 30 having an outwardly opening groove 31 in its outer periphery, which groove receives the generally rectangular bus bar 24. The wheel 30 is journaled on one end of a furcated arm 32 having its opposite end pivoted on a pin 33 received in a clevis bracket 34 secured, as by bolts 35, below the mold to the leading side rail 18 of the rack 12. The arm 32 projects backwardly toward the trailing side of the rack and is adapted to swing up and down about the pin 33 as an axis permitting the wheel 30 to swing toward or away from the underside of the mold.

Briefly stated, in operation, two glass sheets 13 to be bent are supported in superimposed relationship on the bending mold 11 with their edges 23 overhanging the shaping surface 16. The mold and sheets are then moved through the bending zone of the furnace 22 wherein the sheets will soften and sag into contact with the shaping surface. Thereafter the mold 11 is carried by the conveyor 21 into the cooling atmosphere of the annealing zone of the furnace. As the mold moves through the annealing zone, the glass sheets lose heat according to the controlled, gradually reduced temperature of the annealing zone. Adjacent the location in the furnace wherein the bending and annealing zones merge, power is supplied to the heating element 26 from the bus bars 24. The residual heat in the shaping rail 14 and the heat generated in the heating element 26 maintain the areas of the sheets above these members at an elevated temperature as the mold moves through the annealing zone. When the remaining areas of the sheets have cooled to a temperature below the annealing range of glass, the power supply to the heating element 26 is interrupted and the entire sheets allowed to cool to substantially room temperature. The sheet areas above the shaping rail will set in tension due to the reduced rate of cooling thereof and this tension stress will be balanced by compressive stress in the marginal edges of the sheets. To complete the windshield, the two matched bent sheets are assembled with an interposed layer of thermoplastic material such as polyvinyl butyral resin or the like and bonded together under the influence of heat and pressure to form a composite transparent structure.

It will be appreciated that curved or bent sheets produced on the apparatus and by the method of the present invention are materially stronger and resistant to damage than prior known articles of this type since the compressive stress in the sheet edges are of higher unit value and of a more uniform value. In addition, the invention removes the unpredictable factors heretofore encountered in bending and annealing pattern-cut glass sheets. That is to say, the strength of the edge portions of the sheets is not dependent solely upon the amount of heat absorbed by the shaping rail or the rate of cooling of the rail in the annealing zone of the furnace since, through the medium of the heating unit, the overlying areas of the sheets may be maintained at an elevated temperature in a positive manner for any desired period of time.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:
1. A method of bending and annealing glass sheets, comprising supporting a pattern-cut flat glass sheet to be bent on a skeleton-type bending mold having a shaping rail conforming in outline to the sheet but relatively smaller in size to support the sheet inwardly of its marginal edges, heating the sheet while thus supported to an elevated temperature sufficient to cause the sheet to soften and sag into contact with a curved shaping surface formed on said shaping rail, subjecting said sheet to a cooling atmosphere to reduce the temperature thereof in a controlled manner, and simultaneously supplying supplemental heat to said shaping rail to maintain the areas of the glass sheet in contact with and closely adjacent to the shaping surface at an elevated temperature until the remaining areas of the sheet have cooled to a temperature below the annealing range of the glass and then discontinuing said supplemental heat and permitting the total sheet to cool to ambient temperature.

2. In apparatus for bending and annealing glass sheets, the combination of a skeleton-type bending mold having a substantially continuous shaping rail conforming in outline to the glass sheet to be bent but relatively smaller in size, a shaping surface formed on said shaping rail to engage the sheet inwardly of its marginal edges, an electric resistance type heating element attached to said shaping rail, and means coupling said heating element to a source of electrical energy and being operable to selectively initiate and discontinue the heating of said element thereby to maintain the shaping rail at a predetermined temperature.

3. In apparatus for bending and annealing glass sheets, the combination of a skeleton-type bending mold having a shaping rail conforming in outline to the glass sheet to be bent but being relatively smaller in size, a shaping surface formed on upwardly directed edges of said shaping rail to engage the sheet inwardly of its marginal edges, an electric heating means carried by said shaping rail and operable to supply heat to said rail thereby to retard cooling of the areas of said sheet overlying said rail, means forming an electrical circuit between said heating means and a source of electrical energy, and means operable to selectively make and break said electrical circuit.

References Cited by the Examiner

UNITED STATES PATENTS 2,869,287  1/1959  Bamford _____ 65—106 X

FOREIGN PATENTS 102,836  12/1937  Australia.
220,115  2/1959  Australia.

DONALL H. SYLVESTER, *Primary Examiner.*

A. D. KELLOGG, *Assistant Examiner.*